United States Patent [19]

Nagano

[11] Patent Number: 4,734,084
[45] Date of Patent: Mar. 29, 1988

[54] DERAILLEUR FOR A BICYCLE

[75] Inventor: Masashi Nagano, Izumi, Japan

[73] Assignee: Shimano Industrial Company Limited, Osaka, Japan

[21] Appl. No.: 813,922

[22] Filed: Dec. 27, 1985

[30] Foreign Application Priority Data

Dec. 29, 1984 [JP] Japan .................. 59-280808

[51] Int. Cl.$^4$ .............................................. F16H 9/00
[52] U.S. Cl. ........................................ 474/80; 474/82
[58] Field of Search .................................. 474/80, 82

[56] References Cited

U.S. PATENT DOCUMENTS 4,051,738 10/1977 Dian ...................... 474/82

FOREIGN PATENT DOCUMENTS 0013136 7/1980 European Pat. Off. ............ 474/82
2907741 8/1929 Fed. Rep. of Germany ........ 474/82
1055982 4/1959 Fed. Rep. of Germany .
8130180 2/1982 Fed. Rep. of Germany .

Primary Examiner—Stephen J. Novosad
Assistant Examiner—William P. Neuder
Attorney, Agent, or Firm—Stevens, Davis, Miller & Mosher

[57] ABSTRACT

The derailleur includes a linkage mechanism comprising a fixing member fixed to the bicycle frame, a pair of linkage members pivoted to the fixing member, and a movable member carrying a chain guide and pivoted to the linkage members. The linkage mechanism is provided with a displacement structure which elastically biases the linkage mechanism axially of a multistage sprocket assembly when subjected to a force or pressure greater than a normal resistance against speed change, thereby preventing the fixing member and bicycle frame from being plastically deformed as a result of a sudden forceful impact, such as in a collision, hitting a foreign object of if the bicycle falls down.

3 Claims, 6 Drawing Figures

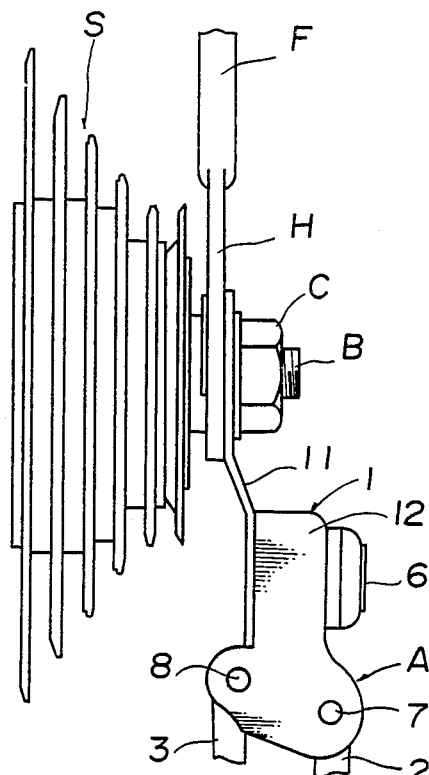
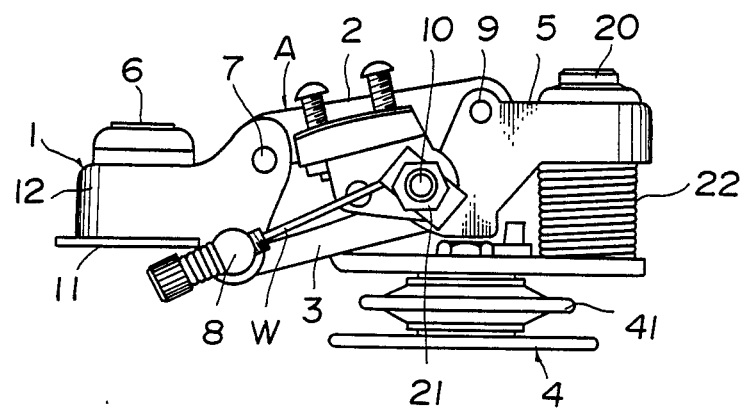

DERAILLEUR FOR A BICYCLE

FIELD OF THE INVENTION

This invention relates to a derailleur for a bicycle, and more particularly to a derailleur for a bicycle, which shifts a driving chain from one sprocket to another of a multistage sprocket assembly mounted on the bicycle frame.

BACKGROUND OF THE INVENTION

Generally, rear derailleurs use with a rear side multistage sprocket assembly are provided with a linkage mechanism comprising a fixing member fixed to a fork end of the bicycle frame, a pair of linkage members, and a movable member having a chain guide. The linkage mechanism is disposed axially outwardly of a smaller diameter sprocket at the multistage sprocket assembly, and the fixing member is fixed to the fork end. The movable member is moved in reciprocation by operating a control wire, and a driving chain engaging with pulleys at the chain guide is shifted to one sprocket at the multistage sprocket assembly, thereby changing the bicycle speed at a predetermined speed changing stage.

Problems exist where the fixing member at the linkage member is fixed to the fork end at the bicycle frame. Since the linkage mechanism projects outwardly with respect to the bicycle frame and no guard is provided for guarding the linkage mechanism, the linkage mechanism is subject to the danger of colliding with the ground or a foreign object, for example, when the bicycle falls down, and is subjected to a force or pressure greater than a resistance against speed change. In this situation, the fixing member particularly is subject to being plastically deformed axially inwardly of the multistage sprocket assembly with respect to the frame. As a result, a problem is created in that the chain guide shifts from the proper position with respect to the multistage sprocket assembly.

When the durability of the fixing member is raised, the plastic deformation thereof caused by a force or pressure greater than the resistance against speed change is reduced, but a problem is created in that the fork end at the bicycle frame is plastically deformed. Thus, the aforesaid problems still remain unsolved.

SUMMARY OF THE INVENTION

An object of the invention is to solve the above-described problem wherein when the linkage mechanism is subjected to a force or pressure greater than the resistance against speed change, the linkage mechanism and the bicycle frame will be plastically deformed. A displacement means is provided which is elastically displaced when the linkage mechanism is subjected to the force or pressure greater than the resistance against speed change, thereby preventing the linkage mechanism and bicycle frame from being plastically deformed, for example, when the bicycle falls down.

The present invention is characterized in that the derailleur, which is provided with a fixing member fixed to the bicycle frame, a pair of linkage members pivoted swingably to the fixing member, and a movable member having a chain guide and pivoted to linkage members, is provided at the linkage mechanism with displacement means for elastically displacing axially of the multistage sprocket assembly with respect to the frame the linkage mechanism when subjected to a force or pressure greater than a normal resistance against speed change performed by deformation of the linkage mechanism.

When the linkage mechanism is subjected to a greater force or pressure by the resistance against speed change as above mentioned, the displacement means is displaced elastically axially of the multistage sprocket assembly so as to absorb a force or pressure greater than the resistance against speed change, thereby ensuring prevention of plastic deformation of the linkage mechanism and the bicycle frame.

The present invention includes a fixing member comprising a bracket member and a base pivotally supporting the linkage members. In this embodiment, the bracket member may be formed of, for example, an elastic material, or an elastic member, preferably a nail spring, is provided between the bracket member and the base.

In an embodiment where the fixing member is fixed directly to the bicycle frame without using the bracket member, the displacement means is provided between a fixing portion at the fixing member to the bicycle frame and a pivot portion at the same to the linkage mechanism.

In each of the embodiments, the displacement means elastically displaces the linkage mechanism axially of the multistage sprocket assembly, thereby attenuating a force or pressure greater than a resistance against speed change caused, for example, when the bicycle falls down, thereby holding a chain guide in a proper position with respect to the multistage sprocket assembly as well as preventing plastic deformation of the linkage mechanism and the bicycle frame.

The above and other objects of the invention will become more apparent upon a reading of the following detailed specification when considered in conjunction with the accompanying drawings.

BRIEF DESCRIPTION OF THE DRAWINGS

FIG. 2 is a partial side view of the FIG. 1 embodiment, FIG. 3 is a bottom view of the derailleur only.

DETAILED DESCRIPTION OF THE INVENTION

Figure 1:
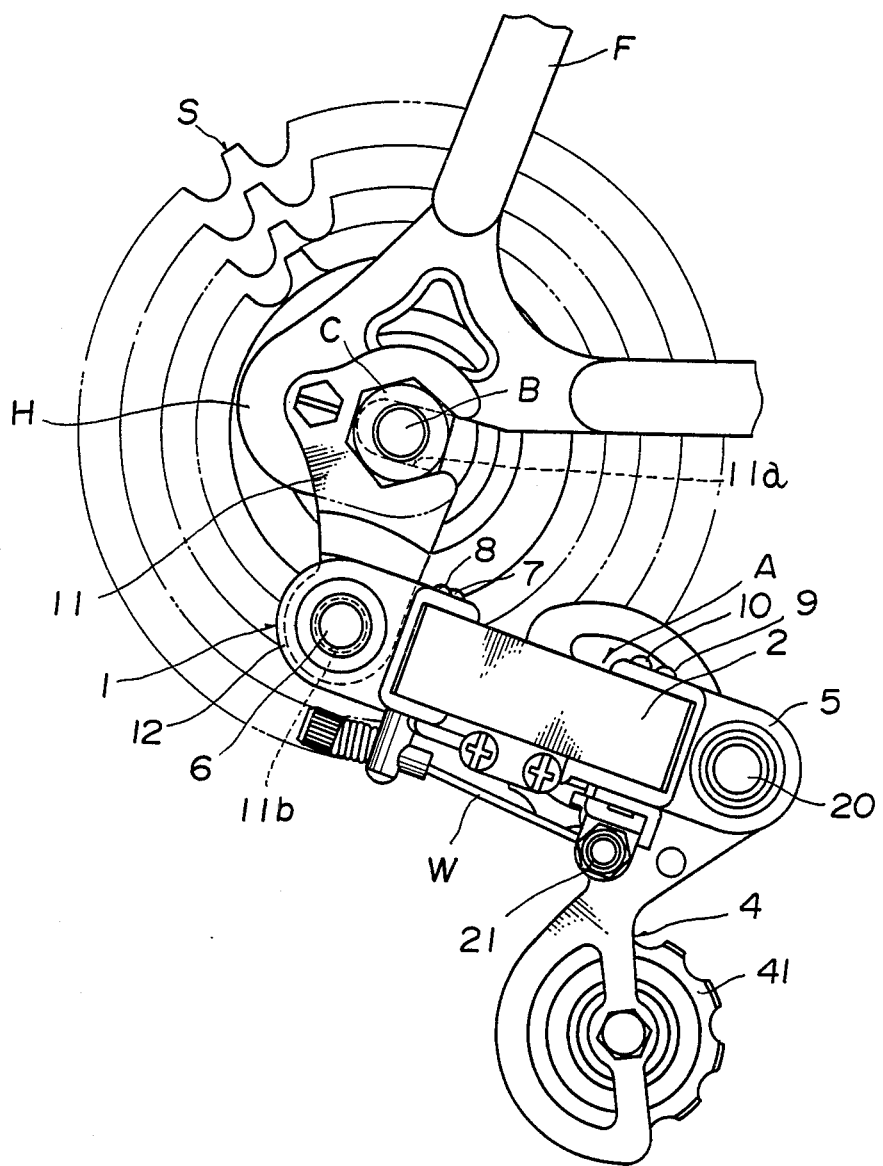
FIG. 1 is a front view of a first embodiment of a derailleur for a bicycle in accordance with the invention, which is incorporated together with a multistage sprocket assembly into the bicycle frame.

In the drawings, a rear bicycle derailleur is shown. Referring to FIGS. 1 through 3, the rear derailleur basically comprises a linkage mechanism A comprising a fixing member 1 fixed to a fork end H at the bicycle frame F, a pair of linkage members 2 and 3 supported to the fixing member 1 such that they are swingable axially of a multistage sprocket assembly S mounted on the rear hub of the bicycle, and a movable member 5 supported to the linkage members 2 and 3 and having the chain guide 4.

The fixing member 1 comprises a bracket member 11 fixed to the fork end H and a base 12 pivoted to the bracket member 11 through a horizontal shaft 6. A pair of mounting projections opposite to each other are provided at one side of the base 12, and the movable member 5 is pivoted to the free end of the linkage members 2 and 3 through a pair of pins 9 and 10.

The movable member 5 is like, the base 12, provided at one side with mounting projections opposite to each other, and pivoted thereby to the linkage members 2 and 3 swingably through the pins 9 and 10. On the other side of the movable member 5, the chain guide 4, having a pulley 41, is mounted through a horizontal shaft 20 such that it is rotatable in a predetermined range only.

The linkage mechanism A constructed as described above is provided between the linkage member 2 or 3 and the movable member 5 or the base 12 with a return spring, by which the chain guide 4 is biased axially of the multistage sprocket assembly S, that is, toward the top gear or the low gear side, normally toward the top gear side. A holder 21 for a control wire W is provided at the linkage member 2 or 3 or the movable member 5. Wire W is pulled to deform the linkage mechanism A against the return spring so that a driving chain carried on the pulley 41 is moved axially of the sprocket assembly S, thereby shifting the chain from one sprocket to another.

Between the chain guide 4 and the movable member 5 is interposed a tension spring 22 which biases the chain guide 4 clockwise to apply tension to the chain. Between the bracket member 11 and the base 12 is interposed a balance spring (not shown) for biasing clockwise the base 12, and in turn the linkage mechanism A. Linkage mechanism A swings in balance of the tension spring 22 with the balance spring, thereby setting the position of chain guide 4 with respect to the multistage sprocket assembly.

The aforesaid derailleur is not different in construction from the existing conventional one.

In the first embodiment shown in FIGS. 1 through 3, a displacement means is provided on the bracket member 11 at the fixing member 1. The displacement means displaces the linkage mechanism A axially of the multistage sprocket assembly with respect to the bicycle frame F.

Such displacement means uses the bracket member 11 formed of an elastic material, such as a leaf spring. The bracket member 11 is not elastically deformed by a normal resistance against speed change acting on the linkage mechanism A, thereby being held in position with respect to the fork end H, but when the linkage mechanism A is subjected to a force greater than the resistance against speed change caused by a fall-down of the bicycle, the bracket member 11 is elastically deformed axially of the multistage sprocket assembly, thereby absorbing the force greater than the aforesaid resistance.

The bracket member 11 is formed of an elastic material, such as a leaf spring of about 1.6 mm in thickness, and, the same as the conventional bracket member, has at one end an insertion recess 11a, and at the other end a threaded bore 11b. Horizontal shaft 6 is inserted into threaded bore 11b, and insertion recess 11a is inserted onto a hub shaft at the rear hub, thereby fixing the bracket member 11 to the fork end H through a locknut C.

The resistance against speed change acts on the linkage mechanism A when the chain is normally shifted, and includes, for example, a resistance for deformation of the linkage mechanism A against the return spring, or that for engagement of the chain with teeth of a large diameter sprocket when the chain is guided by the chain guide 4 and raised by the tooth crest of the same.

The control wire W, the same as in a conventional derailleur, is pulled to deform the linkage mechanism A against the return spring and to move forwardly the movable member 5, and the driving chain is shifted from a smaller diameter sprocket to the larger diameter one. The control wire W is released to deform the linkage mechanism A by a restoring force of the return spring. Thus, movable member 5 is restored, and the chain is shifted from the larger diameter sprocket to the smaller diameter one.

In addition, during the speed change by shifting the chain, the linkage mechanism A is subjected to only the normal resistance against speed change, whereby the bracket member 11 is not deformed.

When the linkage mechanism A collides with the ground or a foreign object by, for example, a fall-down of the bicycle, the fixing member 1 at the linkage mechanism A is subjected to an impact force or pressure greater than the resistance against speed change. As a result, bracket member 11 is elastically deformed axially of the multistage sprocket S with respect to the fork end H, thereby attenuating the greater impact force or pressure. Hence, even when the linkage mechanism A is subjected to the force greater than the resistance against speed change, the linkage mechanism A and fork end H can be prevented from being plastically deformed.

Also, in a case where the chain is intended to be shifted from the smaller diameter sprocket to the larger diameter one without pedalling and with the chain stationary, the speed change is performed as discussed below.

The driving chain in engagement with the smaller diameter sprocket cannot move toward the larger diameter sprocket unless the smaller diameter sprocket rotates. Therefore, the bracket member 11 is elastically deformed according to the speed change operation, whereby the chain can be shifted to the low speed stage. Also, the bracket member 11 conserves an elastic restoring force by the speed change operation, and after the pedalling transports the driving chain to be shiftable toward the larger diameter sprocket, the conserved restoring force allows the chain guide 4 to move toward the low speed sprocket, thereby enabling the chain to be shifted to the low speed sprocket.

In a case where the chain guide 4 is overshifted with respect to the proper position corresponding to the larger diameter sprocket to thereby raise the speed change efficiency when the chain is intended to be shifted from the smaller diameter sprocket to the larger diameter sprocket, the bracket member 11 is adapted to be elastically deformed to an extent of an amount of overshift of the chain guide 4, whereby after the speed change operation, the elastic restoring force allows the chain guide 4 to automatically return to the position corresponding to the larger diameter sprocket.

Figure 4:
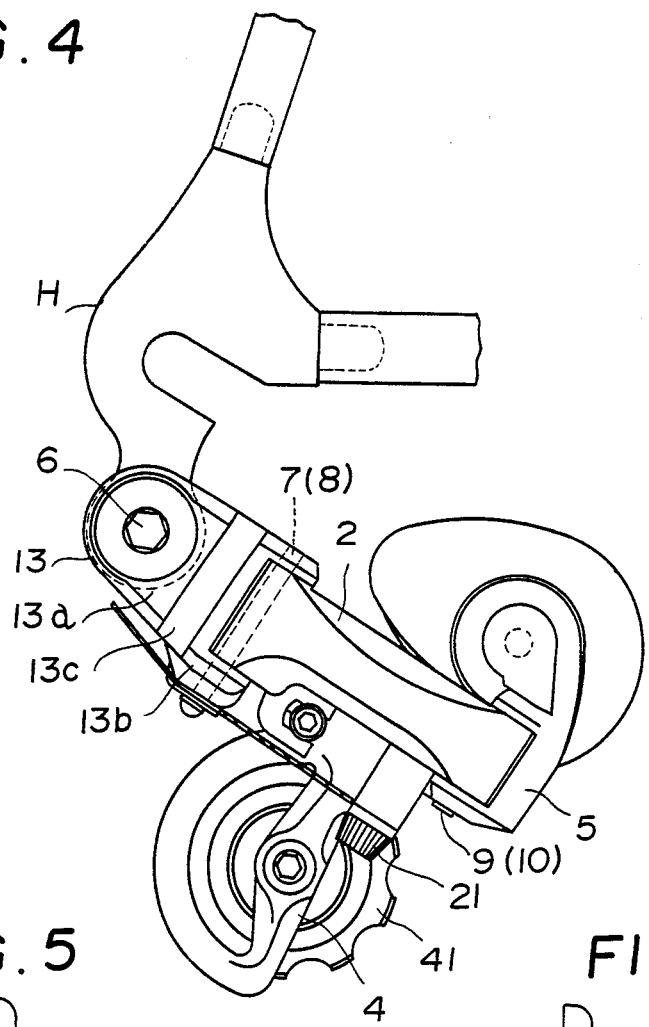
FIG. 4 is a front view of a second embodiment of the invention.

Referring to FIG. 4, a second embodiment of the derailleur of the invention is shown, which has no bracket member and is fixed directly to the fork end H through a fixing member 13. The displacement means is provided at an intermediate portion of the fixing member 13, in detail, an intermediate portion between a fixing portion 13a to the fork end H and the pivot portion 13b to the linkage members 2 and 3. The displacement means in this embodiment is formed of a thin wall portion 13c formed at an intermediate portion of the fixing member 13 of, for example, synthetic resin, and having rigidity overcoming the normal resistance against speed change. In addition, the fixing member 13 itself may be formed of elastic material.

Figure 5:
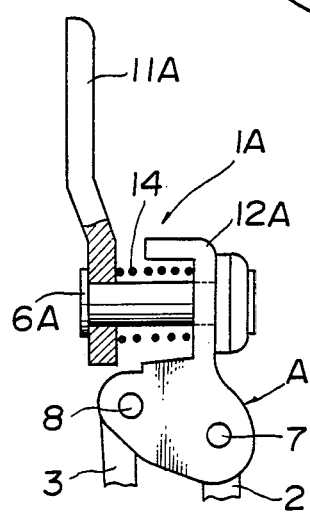
FIGS. 5 and 6 are partially cutaway side views of the principal portions of third and fourth embodiments of the invention.
Figure 6:
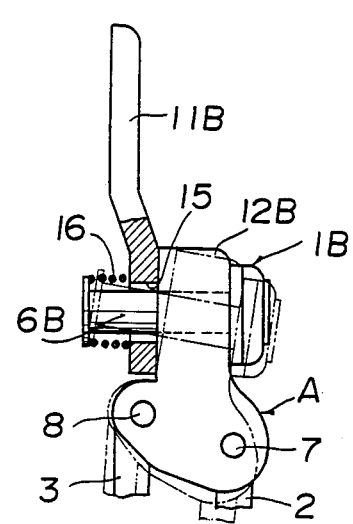

Referring to FIGS. 5 and 6, third and fourth embodiments of the invention are shown, which have bracket members and bases respectively the same as in the first embodiment, so that the displacement means is provided between the bracket members 11A and 11B at the fixing members 1A and 1B and the bases 12A and 12B respectively.

In the third embodiment in FIG. 5, the base 12A is supported with respect to the bracket member 11A such that it is displaceable within a predetermined range axially of a horizontal shaft 6A, and between the base 12A and the bracket member 11A is interposed an elastic member 14, such as a coiled spring, for biasing the base 12A to move away from the bracket member 11A. In this case, during the normal speed change, the elastic member 14A holds the base 12A in position, and deflects when subjected to an impact force or pressure greater than a resistance against speed change. Base 12A is displaced to move toward the bracket member 11A, thereby eliminating the greater force or pressure and allowing the base 12A to return to the original position by means of the restoring force of the elastic member 14.

The fourth embodiment shown in FIG. 6, the same as the third embodiment in FIG. 5, supports the base 12B with respect to the bracket member 11B such that it is displaceable axially of a horizontal shaft 6B, the bracket member 11B is provided with a through bore 15 relatively larger in diameter than the horizontal shaft 6B, and between the bracket member 11B and the end of the horizontal shaft 6B is interposed an elastic member 16, such as a coiled spring, for biasing the base 12B to move toward the bracket member 11B. In this case, during the normal speed change, the displacement of the base member 12B with respect to the bracket member 11B is impeded, the elastic member 16 deflects by a force or pressure greater than the resistance against speed change, and the base 12B deflects as shown by the two-dot-and-dash line, thereby returning to the original position by means of the restoring force of the elastic member 16.

In addition, in the case of the third and fourth embodiments, the bracket members 11A and 11B, the same as in the conventional derailleur, are formed of metal sheets of 4 to 5 mm in thickness respectively.

Also, although the derailleur of the invention has been described above with reference to a rear derailleur, the invention is also applicable to a front derailleur.

Although several embodiments have been described, they are merely exemplary of the invention and not to be construed as limiting, the invention being defined solely by the appended claims.

What is claimed is:

1. A derailleur for a bicycle for shifting a driving chain from one sprocket to another of a multistage sprocket assembly mounted on a frame of said bicycle to thereby change the bicycle speed, comprising:

a linkage mechanism comprising a fixing member having a base member and a bracket member formed of an elastic material by which said fixing member is fixed to said bicycle frame, a pair of linkage members pivoted swingably to said fixing member by said base member, and a movable member having a chain guide and pivoted to said linkage members; and said bracket member comprising a displacement means for elastically displacing said linkage mechanism axially of said multistage sprocket assembly with respect to said bicycle frame responsive to said linkage mechanism being subjected to a force greater than a resistance against speed change by shifting said driving chain.

2. A derailleur for a bicycle for shifting a driving chain from one sprocket to another of a multistage sprocket assembly mounted on a frame of said bicycle to thereby change the bicycle speed, comprising:

(a) a linkage mechanism comprising a fixing member fixed to said bicycle frame, a pair of linkage members pivoted swingably to said fixing member, and a movable member having a chain guide and pivoted to said linkage members; and (b) displacement means for elastically displacing said linkage mechanism axially of said multistage sprocket assembly with respect to said bicycle frame responsive to said linkage mechanism being subjected to a force greater than a resistance against speed change by shifting said driving chain, (c) said fixing member comprising a bracket member fixed to said bicycle frame and a base member by which said linkage members are pivoted swingably to said fixing member, said displacement means being disposed between said bracket member and said base member, (d) support means for supporting said base member to be movable axially of said multistage sprocket assembly with respect to said bracket member, and (e) said displacement means comprising an elastic member for biasing said base member axially of said multistage sprocket assembly with respect to said bracket member and for holding said base member in a predetermined position with respect to said bracket member, said elastic member being interposed between said base member and said bracket member and comprising a spring for biasing said base member away from said bracket member, said support means including a horizontal shaft extending horizontally, said horizontal shaft passing through said base member and said bracket member and comprising a head at one axial end and an end member at another axial end, said head being engageable with said base member, said elastic member being disposed between said end member and said bracket member, said elastic member for bringing said base member into press-contact with said bracket member.

3. A derailleur for a bicycle for shifting a driving chain from one sprocket to another of a multistage sprocket assembly mounted on a frame of said bicycle to thereby change the bicycle speed, comprising:

a linkage mechanism comprising a fixing member fixed to said bicycle frame, a pair of linkage members pivoted swingably to said fixing member, and a movable member having a chain guide and pivoted to said linkage members;

said fixing member comprising a fixing portion at which said fixing member is fixed to said bicycle frame, a pivot portion at which said fixing member is pivoted to said linkage members, and a displacement means comprising an elastic part of said fixing member disposed between said fixing portion and said pivot portion, said displacement means for elastically displacing (i) said pair of linkage members, (ii) said movable member and (iii) said pivot portion of said fixing member axially of said multistage sprocket assembly with respect to said bicycle frame responsive to said linkage mechanism being subjected to a force greater than a resistance against speed change by shifting said driving chain.

* * * * *